L. LOEB.
LIFE GUARD FOR MOTOR VEHICLES.
APPLICATION FILED JAN. 27, 1915.
1,230,911.
Patented June 26, 1917.
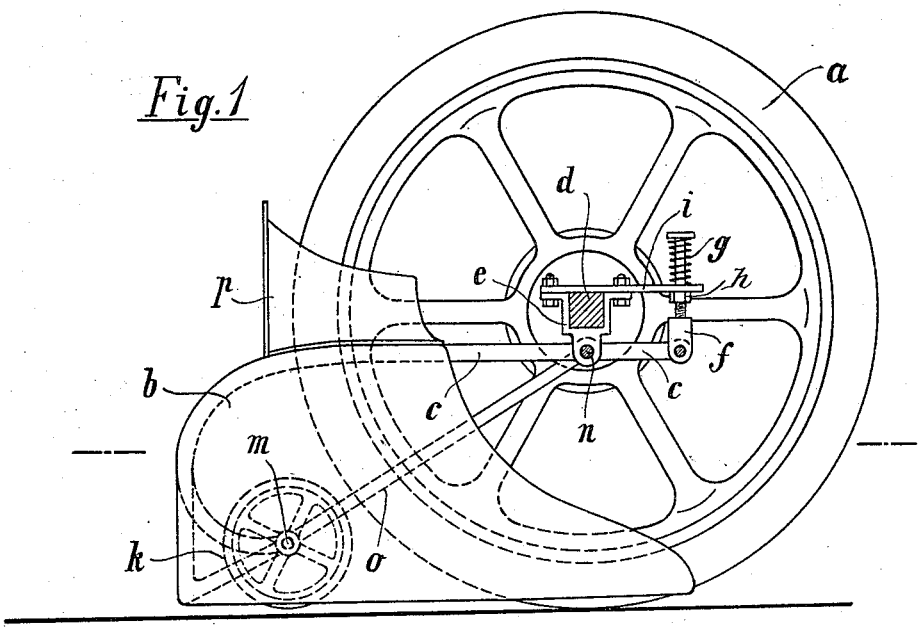
Fig. 1
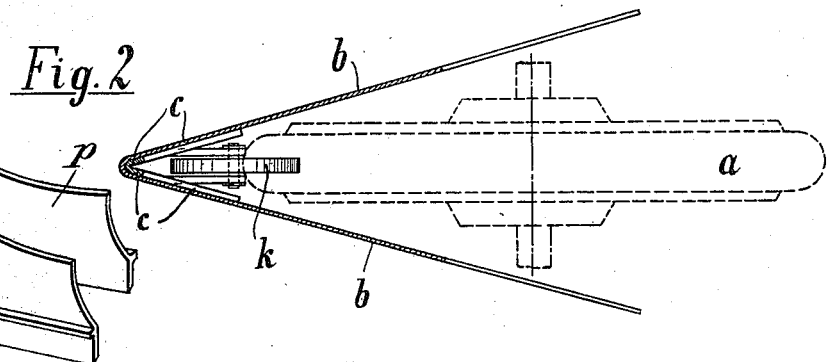
Fig. 2
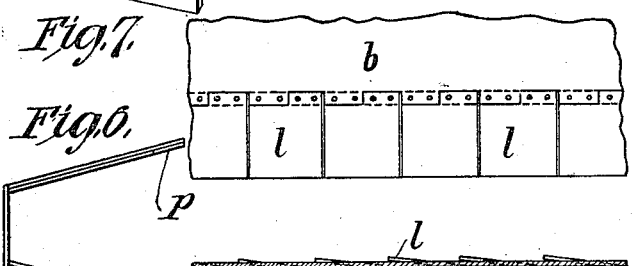
Fig. 7
Fig. 6
Fig. 4
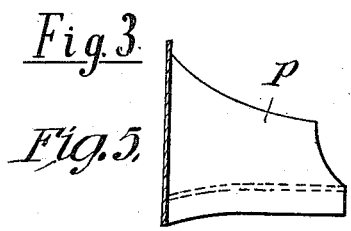
Fig. 3
Fig. 5
Witnesses:
John C. Sanders
Albert F. Heuman
Inventor:
Leopold Loeb

UNITED STATES PATENT OFFICE.

LEOPOLD LOEB, OF NEUWIED, GERMANY.

LIFE-GUARD FOR MOTOR-VEHICLES.

1,230,911.   Specification of Letters Patent.   Patented June 26, 1917.

Application filed January 27, 1915. Serial No. 4,603.

*To all whom it may concern:*

Be it known that I, LEOPOLD LOEB, a subject of the German Emperor, residing at Neuwied, Germany, have invented new and useful Improvements in Life-Guards for Motor-Vehicles, of which the following is a specification.

The present invention relates to a life guard especially adapted for motor cars, bicycles and the like, and has for its object to provide an apparatus to efficiently accomplish this end and also to be of such a construction that it will not be easily damaged when struck by the various obstacles with which it must come in contact. The essential feature of the invention consists in providing a guard formed of sheet-iron bent into an angle and placed immediately in front of each wheel with the point of the angle projecting forward. The lower part of the guard clears the ground by a small amount and is prevented from coming in contact with the ground by a small wheel which is pivoted near the forward end of the guard and projects slightly below it, although the wheel is not normally in contact with the ground. In this way a life guard is provided which pushes aside persons in danger of being caught by the wheels and also other objects with which it may come in contact; and it is so made that it clears the ground at all times and is prevented from coming into contact with the irregularities of the road.

The method of carrying out the invention is shown in the accompanying drawings in which:

Figure 1 shows a side elevation of a wheel fitted with the new life guard;

Fig. 2 is a sectional plan of the same on line 2—2 of Fig. 1;

Figs. 3 and 4 are details showing a method of constructing the lower edge of the guard; and Figs. 5, 6, and 7 are details of a removable top.

Immediately in front of each wheel $a$ of the vehicle and a short distance above the ground a guard or shield of sheet-iron $b$ bent into an angular shape and having its point projecting forward is secured to arms $c$ carried from the axle of the wheel. In the form of construction shown in the drawings this sheet-iron guard extends rearwardly approximately as far as the center of the wheel. The arms $c$ upon which the guard $b$ is carried are pivotally mounted on journal pieces or brackets $e$ clamped to some non-revoluble part of the wheel axle $d$. The arms $c$ extend rearwardly beyond the pivots $n$ of the brackets $e$ and at their ends are pivotally connected to vertical bars $f$ through which an upward force is exerted upon the ends of the arms $c$ by the springs $g$ acting upon the plates or brackets $i$ and the vertical bars $f$ to draw the said arms upward. Adjustable stops $h$ are provided on the bars $f$ adapted to contact with the plates $i$ and to control the normal position of the guards $b$. Adjustment of these stops $h$ determines the amount of clearance between the guard and the ground which may be modified within certain limits according to the nature of the road since a greater clearance will be required on a rough road than upon a smooth pavement.

Near the front end of the arms $c$ but within the guard $b$ is journaled a wheel $k$ the rim of which projects slightly below the lower edge of the sheet-iron guard. This wheel is not normally in contact with the ground but when passing over a slight elevation serves to raise the guard $b$ against its own weight and the pressure of the springs $g$ and so prevents the sheet-iron from coming into contact with the surface. In order that the construction may be more rigid, bars $o$ may be provided extending from the journal $m$ of the small wheel $k$ to the pivot $n$ upon which the arms $c$ are carried.

When the vehicle is in motion the device operates to push aside persons or objects on the road in the path of the wheel so that the wheels do not pass over and crush them. The clearance may be made so small that nails and the like lying upon the road are swept away so that they cannot injure the rubber tire. In the case of there being bumps upon the road, the wheel $k$ comes in contact with the road and operates to raise the life guard so that it shall always clear the road thus avoiding the possibility of damage to the guard itself.

A further advantage of the device is that, in addition to protecting the wheel itself from being damaged by obstacles in the road, the guard also prevents passersby on the side-walks from being splashed and soiled from the mud thrown by the wheel. In snowy weather the guard may be provided with a removable top *p* as shown in Figs. 5, 6, and 7, and adjusted as shown in Fig. 1 so that the device serves also as a snow-plow to clear the path for the wheel of the vehicle even when the snow is quite deep.

As shown in detail in Figs. 3 and 4, the bottom part of the guard *b* may be provided with a row of narrow steel plates *l* mounted so as to overlap each other. These small plates being of resilient material serve to soften the shocks given by the smaller objects encountered in the road. The steel plates *l* are notched at the top whereby a pair of lugs is produced upon each, one of which lugs may be riveted to the outside of the guard and the other to the inside so that the plates are given a slanting and overlapping position thus tending to prevent dust from getting inside the guard. The overlapping ends of the plates have, however, sufficient play so as not to modify the resiliency of the plates.

The structure may be further modified by allowing the plates *l* to project far enough down to contact with the ground or providing their lower edges with bristles whereby the dust of the road and objects likely to injure the tire may be swept aside. If the plates are allowed to contact with the ground it is preferable to provide their lower ends with rubber strips to take the wear and reduce the noise which would be caused by the contact of the plates with the ground. A rubber coating may also be provided on the point of the guard in order to lessen the danger of serious injury to persons caught by the life guard.

What I claim as my invention and desire to secure by United States Letters Patent is:

1. A life guard for vehicle wheels comprising an angular sheet metal guard mounted upon arms pivotally supported from the wheel axle, said arms extending rearwardly beyond the pivotal support, vertical bars attached to the ends of said arms and projecting upward; brackets attached to the wheel axle; adjustable stops upon said vertical bars adapted to bear against said brackets and support said guard in its normal position, springs upon said bars bearing against said brackets adapted to yieldingly maintain said guard in normal position; and a wheel mounted upon said arms near their forward ends.

2. A life guard for vehicle wheels comprising an angular sheet metal guard mounted upon arms pivotally supported from the wheel axle, said arms extending rearwardly beyond the pivotal support, vertical bars attached to the ends of said arms and projecting upward; brackets attached to the wheel axle; adjustable stops upon said vertical bars adapted to bear against said brackets and support said guard in its normal position, springs upon said bars bearing against said brackets adapted to yieldingly maintain said guard in normal position; and a wheel mounted upon said arms near their forward ends; and overlapping resilient plates slantingly attached to bottom edge of guard.

In testimony whereof I have signed my name to this specification in the presence of two subscribing witnesses.

LEOPOLD LOEB.

Witnesses:
J. WYNEN,
K. DEGEN.

Copies of this patent may be obtained for five cents each, by addressing the "Commissioner of Patents, Washington, D. C."